United States Patent
Hamud

(10) Patent No.: US 9,987,564 B1
(45) Date of Patent: Jun. 5, 2018

(54) METHOD, SYSTEM, AND DEVICE FOR CONDUCTING A WAGERING GAME

(71) Applicant: Garry Hamud, Las Vegas, NV (US)

(72) Inventor: Garry Hamud, Las Vegas, NV (US)

(*) Notice: Subject to any disclaimer, the term of this patent is extended or adjusted under 35 U.S.C. 154(b) by 0 days. days.

(21) Appl. No.: 15/095,155

(22) Filed: Apr. 10, 2016

(51) Int. Cl.
  *A63F 13/10* (2006.01)
  *A63F 9/24* (2006.01)
  *A63F 13/95* (2014.01)
  *G06F 17/30* (2006.01)

(52) U.S. Cl.
  CPC ........... *A63F 13/95* (2014.09); *A63F 9/24* (2013.01); *G06F 17/30* (2013.01)

(58) Field of Classification Search
  USPC ............................................. 463/9
  See application file for complete search history.

(56) References Cited

U.S. PATENT DOCUMENTS

| 6,402,148 | B1* | 6/2002 | Saruwatari | A63F 3/00157 273/292 |
| 2005/0082756 | A1* | 4/2005 | Duncan | A63F 3/00157 273/274 |
| 2006/0089850 | A1* | 4/2006 | Ko | A63F 3/00157 273/303 |
| 2011/0014963 | A1* | 1/2011 | Walker | G07F 17/32 463/12 |
| 2016/0351018 | A1* | 12/2016 | Reeves | G07F 17/3293 |

\* cited by examiner

*Primary Examiner* — Pierre E Elisca
(74) *Attorney, Agent, or Firm* — Mark A. Litman & Associates, P.A.

(57) ABSTRACT

A method and device for conducting blackjack-type games includes receiving a base wager and dealing at least one initial player hand and an initial dealer hand. A final player hand is formed from each initial player hand. A final dealer hand is formed. If the final dealer hand is a predefined modified dealer bust hand, the base wager is paid according to a pay table which includes at least one payout that is less than even money and at least one payout that is greater than even money. The base wager may otherwise be resolved in a manner consistent with conventional blackjack.

7 Claims, 2 Drawing Sheets

METHOD, SYSTEM, AND DEVICE FOR CONDUCTING A WAGERING GAME

FIELD OF THE INVENTION

The present invention relates to wagering games. More specifically, the present invention includes a system, method, and computer device for conducting a wagering game in which a base wager on a player hand may be rewarded at a different rate depending on the player hand and/or the dealer hand.

BACKGROUND OF THE INVENTION

Blackjack is a well-known card game played in casinos. The object of the game is to have a final hand total closer to twenty-one than the final dealer hand total without exceeding twenty-one. For purposes of calculating the final hand total, each card has a value equal to its face value except face cards, which have a value of ten, and Aces, which may have a value of eleven or one, depending on which forms the best hand. In conventional blackjack, the suit of the cards is irrelevant. A final hand total that exceeds twenty-one is said to "bust" and is considered a losing hand.

The form of blackjack played in casinos is banked by the house and is played between a dealer, representing the house, and at least one player. In a typical blackjack game, each player makes a base wager in a wagering area on a playing surface. The dealer deals an initial player hand containing two cards to each player and an initial dealer hand containing two cards to himself or herself. The two cards of the initial dealer hand may be dealt together, with one card face up and the other face down, or dealt separately, with a first card dealt before completing the players' hands and a second card dealt after completing the players' hands.

If the initial dealer hand does not have a natural twenty one, any initial player hand receiving a natural twenty-one or blackjack, i.e. a total of twenty-one in the initial dealt hand, is immediately rewarded, typically at a rate of 2:1, 3:2, or 6:5, and play is terminated as to that player. Each remaining player examines his or her initial player hand and decides whether to hit, i.e. receive another card, or stand, i.e. stop with the current hand. A player may hit as many times as the player wishes as long as the player does not bust, i.e. receive a card causing the cumulative sum of the values of the cards in the player's hand to exceed twenty-one. When a player busts, the player's wager is immediately collected and play is terminated as to that player.

A player may have additional options available depending on the initial player hand dealt. For example, a player may have the option to double down. Although the availability of the double down option vary from casino to casino, doubling down allows a player to double the player's wager in exchange for a single additional card dealt to the initial player hand. This option is typically selected when a player feels that he or she has a reasonable chance of winning by drawing only a single card. This is often the case when the player has an initial two-card total of ten or eleven, so that any ten-value card will give the player a total of twenty or twenty-one, or when the dealer has an exposed card of a five or six, and the player feels it likely that the dealer will bust.

A player may also have the option to split the initial player hand. Specifically, if the player receives a pair, i.e. two cards having the same card value, the player may split the pair and use each card as a basis for a separate hand. For example, if a player were to be dealt a pair of eights, the player may choose to split the pair and continue play with two separate hands each containing an eight and an additional dealt card. Each of the individual split hands is played independently, with the player free to hit or stand (or, possibly, split or double down depending on the house rules) the newly formed split hands.

After all the players have formed final hands, the dealer reveals the face-down card in the dealer hand. The dealer completes the dealer hand according to established house rules. That is, the casino uses established rules to eliminate discretion by the dealer in forming the dealer hand and the dealer hits or stands as the house rules dictate. The final dealer hand is compared to each final player hand and the target value of twenty one to resolve the wagers. In resolving the wagers, a player hand outranks or beats a dealer hand if the total sum of the cards in the player hand is closer to twenty-one than the total sum of the cards in the dealer hand is. For example, if the final dealer hand has a total sum of nineteen and a final player hand has a total sum of twenty, the final player hand "wins" because it is closer to the target value of twenty-one than the final dealer hand is. Wagers on winning player hands are typically rewarded at even money, i.e., 1:1. Wagers are collected from player hands with a final hand total further from twenty-one than the final hand total of the dealer hand is. If the dealer hand busts, all players who did not bust or receive a blackjack are rewarded. If the player and dealer push, i.e., have hands with the same final hand total, the player's wager is returned.

SUMMARY OF THE INVENTION

The present invention includes systems, methods, and devices for conducting a wagering game. In one optional embodiment, a method may be conducted at a live table, electronic table, video gaming machine, kiosk, handheld device, cellular telephone, tablet, personal computer, or in any other fashion. In an optional embodiment conducted using a device, a device may include a logic controller in communication with a display, a player interface, and a data storage device.

The present invention includes a method for conducting a blackjack-type game. In one optional embodiment, at least one base wager is received. In an optional embodiment executed by a device, the base wager may be received through a player interface.

An initial player hand of playing cards is dealt for each base wager. Similarly, an initial dealer hand of playing cards is dealt. In one optional embodiment executed by a device, the initial player hand and/or initial dealer hand may be dealt using a random outcome generator, such as a card shuffling/dealing device, random number generator, logic controller, or the like.

At least one final player hand is formed from each initial player hand by standing on the initial player hand or receiving at least one additional playing card dealt to the initial player hand. In an optional embodiment executed on a device, an election may be received through a player interface to stand or hit. If an initial player hand contains playing cards with a sum equal to the target value, the base wager is typically rewarded at a predefined blackjack rate greater than even money. If the sum of the playing cards in a final player hand exceeds a target value, the base wager is collected and play is terminated for the final player hand.

A final dealer hand is formed from the initial dealer hand by standing on the initial dealer hand or receiving at least one additional playing card dealt to the initial dealer hand. In an optional embodiment implemented on a device, the final dealer hand may be formed by a logic controller executing program instructions the form a final dealer hand according to house rules.

If the sum of the playing cards in a final dealer hand exceeds a target value, the base wagers are typically rewarded at even money and play is terminated. However, a plurality of final dealer hands each containing playing cards with a sum that exceeds the target value, i.e., dealer bust hands, are defined to be modified dealer bust hands. In one such optional embodiment, the modified dealer bust hand is defined based on the value of the playing card that causes the final dealer hand to exceed the target value, i.e., causes the final dealer hand to bust. A pay table is defined in which at least one modified dealer bust hand is correlated to a payout that is greater than the blackjack rate and at least one modified dealer bust hand is correlated with a payout that is less than even money. In an optional embodiment embodied in a device, a pay table may be stored in a data storage device communicating with a logic controller. When the final dealer hand matches a modified dealer bust hand, it is rewarded based on the pay table. In an optional embodiment implemented on a device, base wagers may be resolved by a logic controller executing program instructions according to a method of the present invention.

When the sum of the playing cards in the final dealer hand is less than or equal to the target value, any remaining base wagers are resolved by comparing each final player hand to the final dealer hand and the target value. In an optional embodiment conducted using a device, comparisons may be made by a logic controller executing program instructions.

DESCRIPTION

Figure 1:
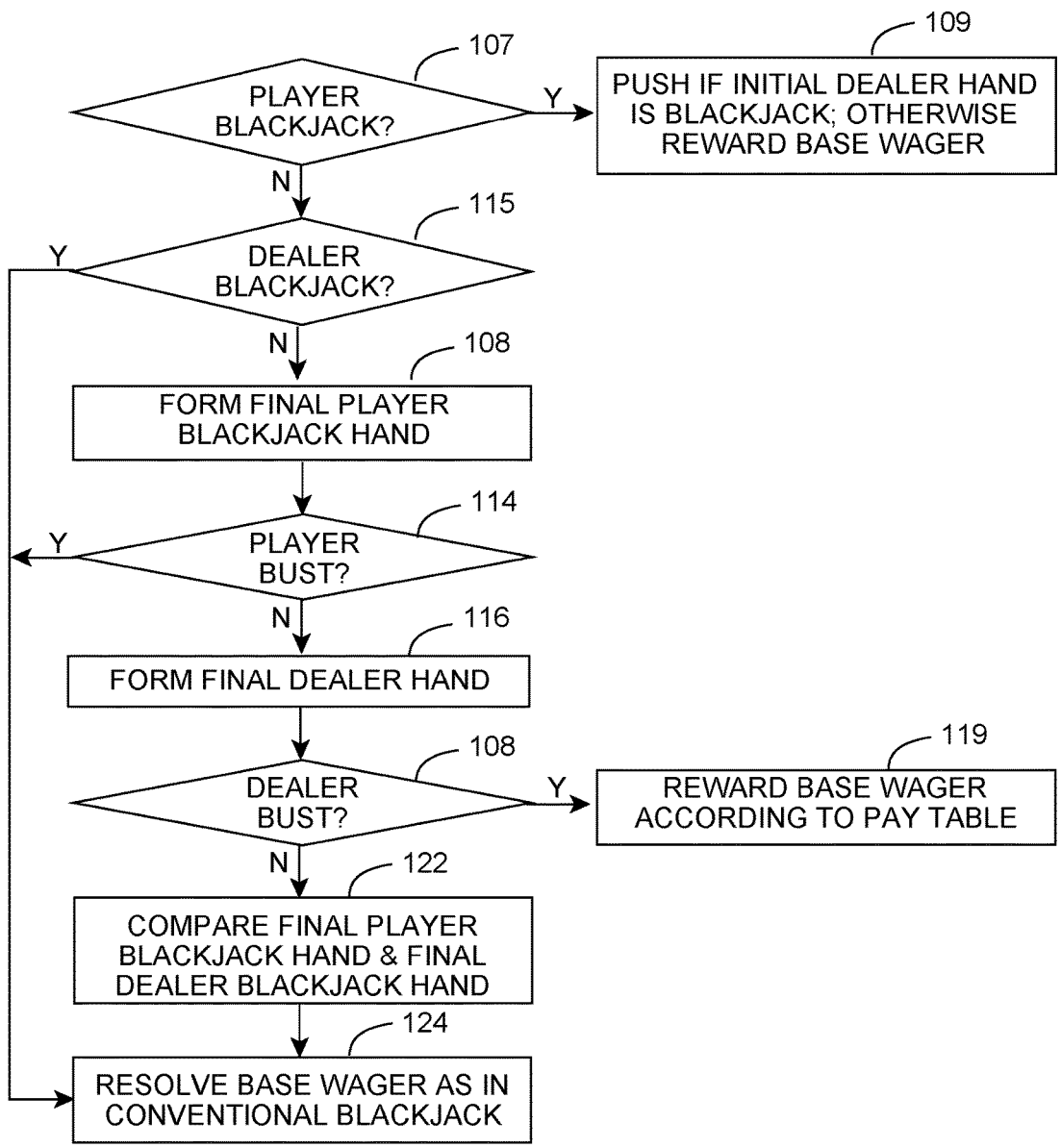
FIG. 1 is a flow chart of a method conducted according to an embodiment of the present invention.

Reference is now made to the figures wherein like parts are referred to by like numerals throughout. The present invention includes methods and devices for conducting blackjack-type games. Specifically, the present invention includes embodiments of methods and devices for conducting games based on the familiar conduct of blackjack with modifications to the pay structure and hand formation process.

The present invention may be implemented in a live table game, electronic device, or hybrid live and electronic system. For example, the present invention could be implemented at: live tables; electronic tables; electronic gaming machines; linked gaming terminal systems; or networked or standalone personal computers, mobile phones, mobile devices, interactive televisions, kiosks, or the like. It is noted that these examples are intended to be illustrative rather than exhaustive.

A method and device according to the present invention may be conducted using a single deck or multiple decks of playing cards, or electronic representations thereof. Moreover, the present invention may utilize conventional fifty-two card decks, extended decks (such as decks supplemented with Jokers, or the like), truncated decks (such as Spanish decks or the like), or any other deck constitution. In an optional embodiment implemented on a device, the constitution of the deck(s) may be a game parameter stored in a data storage device.

The present invention may be a variation on conventional blackjack, with only the variations directed to a pay table defined for modified dealer bust hands. Alternatively, the present invention could be combined with other modifications to blackjack, such as Spanish 21 or other blackjack variations.

A modified dealer bust hand is defined. A modified dealer bust hand may be defined based on the quantity of cards in the final dealer hand when it busts, the value of the card causing the final dealer hand to bust, a combination thereof, or the like. Thus, in one optional embodiment, a modified dealer bust hand may be defined to occur when the final dealer hand busts on the third card (or, depending on the optional embodiment, fourth card, fifth card, sixth card, or so on). In another optional embodiment, a modified dealer bust hand may be defined to occur when the final dealer hand busts when the card causing the final dealer hand to bust is a six (or, depending on the optional embodiment, seven, eight, nine, or so on). In yet another optional embodiment, a modified dealer bust hand may be defined to occur when the total sum of the cards in the final dealer hand, including the playing card causing the bust, is a defined hand sum such as twenty-two (or, depending on the optional embodiment, twenty-three, twenty-four, and so on). Although these examples are directed to the value of the card causing the final dealer hand to bust, it is contemplated that any characteristic of the final dealer hand and/or the playing cards in the final dealer hand may be used to characterize a final dealer hand as a modified dealer bust hand.

A pay table is defined with at least one modified dealer bust hand associated with a payout on the base wager of greater than even money. In one optional embodiment, the payout is greater than, or equal to, the blackjack payout. For example, in an optional embodiment, at least one modified dealer bust hand is associated with a payout of at least three to two.

The pay table is also defined with at least one modified dealer bust hand associated with a payout on the base wager of less than even money or a loss of the base wager. These actions would have the effect of increasing the house advantage in the game and thereby offset other changes to the game that would otherwise lower the overall house advantage without the offset of the house advantage elsewhere. It is noted that in the optional embodiment illustrated, the wagers paid using the pay table are the base wagers on the blackjack game itself rather than side wagers. That is, the action taken in response to the occurrence of a modified dealer bust hand is taken with respect to the base wager placed for eligibility in the game and which is staked on the outcome of the player hand, rather than a separate side or secondary wager.

TABLE 1

| Final Dealer Hand | Payout |
| --- | --- |
| Bust with a 6 Pays | 4:1 |
| Bust with a 7 Pays | 3:1 |
| Bust with a 8 Pays | 3:2 |
| Bust with a 9 Pays | 3:2 |
| Bust with Jack, Queen, King Pays | 1:2 |
| Bust with Natural 10 | Push all Wagers |
| Any other Win | 1:1 |
| Blackjack | Pays per House Rules |

Payouts paid in response to a modified dealer bust hand may be issued only when the final player hand is not a bust hand. Such an optional embodiment would retain the possibility that base wagers may be lost rather than paid based on the pay table if the final player hand busts prior to the formation of the final dealer hand. Alternatively, pay outs for a modified dealer bust hand may be paid whenever the final dealer hand is a modified dealer bust hand without regard to the final player hand. Such an optional embodiment would create "instant win" hands not found in conventional blackjack.

An example of a method according to an embodiment of the present invention is illustrated in FIG. 1. In one such optional embodiment, base wagers are received 102. As discussed above, in an optional embodiment, the present invention alters the handling of the base wager required for participation in, and staked on the outcome of, the blackjack game and does not require a side wager.

An initial player hand is dealt 104. The initial player hand contains two cards. In an optional embodiment, illustrated in FIG. 1, the initial dealer hand is also dealt 106, although as noted above, under certain rules, it is contemplated that the initial dealer hand may not be dealt until after the final player hands are formed.

Final player hands are formed 108. In one optional embodiment illustrated in FIG. 1, final player hands are formed using at least the conventional blackjack options of hitting or standing (and, optionally, splitting or doubling down). It is contemplated that certain initial player hands may automatically be considered final player hands. For example, a blackjack 107 or natural hand, i.e., an initial hand with two cards having a total sum of twenty-one, may be a final player hand. In one optional embodiment, blackjack hands may be rewarded 109 unless the final dealer hand is also a blackjack holding, as in conventional blackjack. In another optional embodiment, some or all blackjack hands may be modified player winning hands that are automatically and instantly rewarded regardless of the final dealer hand.

If, in the course of forming a final player hand, the total sum of the values of the cards in the player hand exceeds 114 the target value of twenty-one, the base wager associated with that player hand may be collected and play terminated for that player hand in a manner similar to conventional blackjack.

A final dealer hand is also formed 116. In an optional embodiment, a final dealer hand may be formed according to house rules for hitting or standing that are similar or identical to house rules commonly found in conventional blackjack. For example, a typical house rule would be that the dealer hits a hand until the total sum of the cards in the final dealer hand is seventeen or greater, with any aces counted as eleven unless counting the ace as eleven causes the total sum to exceed twenty-one. In another example, a typical house rule would be that the dealer hits a hand until the total sum of the cards in the final dealer hand is seventeen or greater with aces counted as one, or eighteen or greater with aces counted as eleven. If the final dealer hand is a blackjack 115, i.e., the two cards dealt to the initial dealer hand have a total sum of twenty-one, base wagers may be collected except base wagers on final player hands that form blackjack hands, which may be returned.

If, in the course of forming a final dealer hand, the total sum of the cards in the dealer hand exceeds twenty-one, a determination is made 118 whether the final dealer hand is a predefined modified dealer bust hand. As noted above, the determination of whether a final dealer hand is a modified dealer bust hand may be based on the quantity of cards in the final dealer hand, the value of the card causing the final dealer hand to bust, the total sum of the busted hand, or the like.

If the final dealer hand busts, but is not a modified dealer bust hand, the base wager may be paid even money as in conventional blackjack. However, in response to the occurrence of a modified dealer bust hand, the base wagers are paid 119 in accordance with the pay table for modified dealer bust hands. As described above, the pay outs on the pay table could range anywhere from zero, i.e., the base wager is returned 120 or pushed but not paid, to any amount less than even money to any amount greater than even money. In any case, the occurrence of a modified dealer bust hand may end play.

If neither a modified player winning hand nor a modified dealer bust hand occurs, the base wager may be resolved in the conventional manner of blackjack, with the final dealer hand compared 122 to the final player hand and the target value of twenty-one and base wagers paid or collected 124 based on the relative differences between the final dealer hand and final player hand and the target value as in conventional blackjack.

Figure 2:
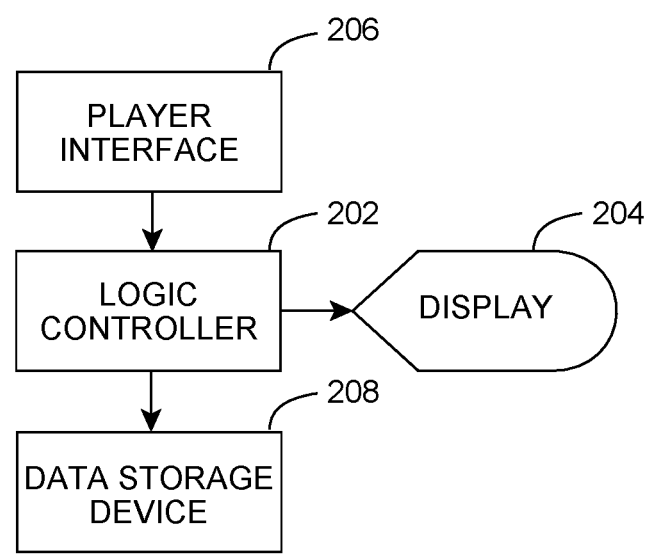
FIG. 2 is a block diagram of a device according to an embodiment of the present invention.

As illustrated in FIG. 2, a method according to an embodiment of the present invention may be implemented using a device. In one optional embodiment, the device only serves to produce random outcomes. Such a random outcome generator may take the form of a playing card shuffler incorporating a random number generator that randomizes playing cards and, optionally, deals randomized hands. Alternatively, a device may perform additional tasks aside from producing random outcomes, such as displaying hands, evaluating and comparing hands, receiving input, and the like.

For example, in one such optional embodiment, a device includes a logic controller 202 in communication with a display 204, a player interface 206, and a data storage device 208. A base wager is received or designated through a player interface 206. Such a player interface may take any form, including a button panel, keyboard, keypad, or the like. In a further optional embodiment, the player interface 206 and display 204 may be combined into a touchscreen device. In response to the base wager, a random outcome is generated by a random outcome generator. In one such optional embodiment, the random outcome generator is a software, firmware, or hardware random number generator working in concert with a logic controller 202 that maps random numbers generated by the random number generator to outcomes, such as playing cards or playing card combinations.

An initial player hand is selected by the random outcome generator and displayed at the display 204. Optionally, a partial initial dealer hand is likewise selected by the random number generator and displayed at the display 204. It is contemplated that the device may be configured for multiple players with each player having his or her own display 204. Alternatively, the device may be configured for multiple players sharing a display 204. In yet another optional embodiment, the device may be configured for a single player and a single display 204. It is also contemplated that a dealer hand may be displayed at a separate display or on the same display as the player hand(s).

A final player hand is formed substantially as described above, with elections to hit or stand (and, optionally, split and double down) received through the player interface 206. In an optional embodiment, a logic controller 202 evaluates the final player hand to determine if it matches a modified player winning hand as stored in parameters at a data storage device 208. If so, the base wager may be resolved by paying an award based on a pay table stored at a data storage device 208. As discussed above, the award may be contingent on a comparison of the final player hand with the final dealer hand or, alternatively, may occur instantly independent of the final dealer hand.

A final dealer hand is formed by the logic controller 202. In an optional embodiment, if the final dealer hand is a modified dealer bust hand, the base wager is resolved in a manner different from that of conventional blackjack. Specifically, rather than issuing a reward, base wagers may be paid at less than even money (including being returned and being paid nothing) or paid at greater than even money.

If neither the final player hand nor the final dealer hand bust or form a blackjack, the final player hand is compared to the final dealer hand and the target value of twenty-one by a logic controller 202. If the final player hand is closer to the target value than the final dealer hand is, an award is issued by the logic controller based on the base wager.

While certain embodiments of the present invention have been shown and described it is to be understood that the present invention is subject to many modifications and changes without departing from the spirit and scope of the invention presented herein.

I claim:

1. A method for conducting a wagering game in which at least one base wager is received in an electronic gaming machine having a computer and display and placed for eligibility in the wagering game through a button panel, keyboard, keypad, or touchscreen on the display, an initial player hand of playing cards is dealt for each base wager, an initial dealer hand of playing cards and an initial dealer hand are dealt and displayed on the display by the computer, at least one final player hand is formed from the initial player hand by standing on said initial player hand or receiving from the computer and displayed on the display at least one additional playing card dealt to said initial player hand, wherein if a sum of the values of the playing cards in a final player hand exceeds a target value, said base wager is collected and play is terminated for said final player hand, the computer forming the final dealer hand from said initial dealer hand by the player indicating through the button panel, keyboard, keypad, or touchscreen on the display to stand on said initial dealer hand or receive at least one additional playing card dealt to said initial dealer hand, and, when a sum of the values in the playing cards in said final dealer hand is less than or equal to said target value, any remaining base wagers are resolved by comparing each final player hand to said final dealer hand and said target value, wherein if an initial player hand contains playing cards with a sum equal to said target value, said base wager is rewarded at a predefined blackjack rate greater than even money, the method comprising:

the computer defining a plurality of final dealer hands containing playing cards with a sum of the values of the playing cards that exceeds said target value is to be modified dealer bust hands;

the computer providing a pay table correlating at least one of said modified dealer bust hands to an increased award greater than, or equal to, said predefined blackjack rate and at least one of said modified dealer bust hand value is correlated to a decreased award less than even money; and issuing said modified award on said base wager according to said pay table when said final dealer hand matches said modified dealer bust hand value and the sum of the playing cards in a final player hand does not exceed said target value.

2. The method of claim 1 wherein said modified dealer bust hand is defined based on the value of the final playing card dealt to said final dealer hand.

3. A method for conducting a wagering game using an electronic gaming machine having a random outcome generator, a display, player input controls through a button panel, keyboard, keypad, or touchscreen on the display, said game including the computer receiving at least one base wager, dealing an initial player hand of playing cards on the display for each base wager based on a random outcome generated by said random outcome generator, the computer dealing and displaying on the display an initial dealer hand and an initial dealer hand of playing cards based on a random outcome generated by said random outcome generator, the processor forming at least one final player hand from each initial player hand by standing on said initial player hand or the player, through input to the computer through player input controls, receiving at least one additional playing card dealt to said initial player hand wherein said at least one additional playing card is dealt by the computer and displayed on the display based on a random outcome generated by said random outcome generator, wherein if the sum of the values of the playing cards in a final player hand exceeds a target value, said base wager is collected and play is terminated for said final player hand, forming a final dealer hand from said initial dealer hand by standing on said initial dealer hand or receiving at least one additional playing card dealt to said initial dealer hand wherein said at least one additional playing card is dealt based on a random outcome generated by said random outcome generator, wherein if the sum of the playing cards in a final dealer hand exceeds a target value said base wagers are rewarded and play is terminated, and, when the sum of the playing cards in said final dealer hand is less than or equal to said target value, the computer resolving any remaining base wagers by comparing each final player hand to said final dealer hand and said target value, wherein if an initial player hand contains playing cards with a sum of their values equal to said target value, said base wager is rewarded by the computer at a predefined blackjack rate greater than even money, the method comprising:

the computer defining a plurality of final dealer hands containing playing cards with a sum that exceeds said target value to be modified dealer bust hands;

the computer defining a pay table correlating at least one of said modified dealer bust hands to a modified award greater than, or equal to, said predefined blackjack rate and at least one modified of said modified dealer bust hands to a modified award less than said even money;

the computer issuing an award of even money on said base wager when: (a) said final dealer hand contains playing cards with a sum that exceeds said target value but is not a modified dealer bust hand and (b) the sum of the playing cards in a final player hand does not exceed said target value; and the computer issuing said modified award on said base wager according to said pay table when said final dealer hand value of the playing cards matches the sum of the playing card values said modified dealer bust hand and the sum of the values of the playing cards in the final player hand does not exceed said target value.

4. The method of claim 3 wherein said values of the modified dealer bust hand is defined by the computer based on the value of the sum of the values of the final playing card dealt to said final dealer hand.

5. An electronic gaming machine comprising a logic controller including a random number generator; a player interface in communication with said logic controller; a display in communication with said logic controller; and a data storage device in communication with said logic controller configured to store electronic representations of playing cards, a target value, a plurality of final dealer hands containing playing cards with a sum that exceeds said target value defined to be modified dealer bust hands, a pay table correlating at least one of said modified dealer bust hands to a modified award greater than, or equal to, said predefined blackjack rate and at least one modified of said modified dealer bust hands to a modified award less than said even money, and program instructions executable by said logic controller to conduct the steps of: receiving at least one base wager through said player interface; dealing an initial player hand of playing cards for each base wager based on a random outcome generated by said random outcome generator; dealing an initial dealer hand of playing cards based on a random outcome generated by said random outcome generator; rewarding said base wager at a predefined blackjack rate greater than even money and terminating play for an initial player hand when said initial player hand contains playing cards with a sum equal to said target value; forming at least one final player hand from each initial player hand by standing on said initial player hand or receiving at least one additional playing card dealt to said initial player hand wherein said at least one additional playing card is dealt based on a random outcome generated by said random outcome generator; collecting said base wager and terminating play for a final player hand when the sum of the playing cards in said final player hand exceeds a target value; forming a final dealer hand from said initial dealer hand by standing on said initial dealer hand or receiving at least one additional playing card dealt to said initial dealer hand wherein said at least one additional playing card is dealt based on a random outcome generated by said random outcome generator; the computer issuing an award of even money on said base wager when (a) said final dealer hand contains playing cards with a sum of the values of the playing cards that exceeds said target value but is not a modified dealer bust hand and (b) the sum of the values of the playing cards in a final player hand does not exceed said target value; issuing said modified award on said base wager according to said pay table when said values of the playing cards in the final dealer hand matches said modified dealer bust hand and the sum of the values of the playing cards in the final player hand does not exceed said target value; and the computer resolving any remaining base wagers by comparing the sum of the values of each final player hand to said final dealer hand and said target value when the sum of the values of the playing cards in said final dealer hand is less than or equal to said target value.

6. The electronic gaming machine of claim 5 wherein said modified dealer bust hand is defined by the computer based on the value of the sum of the value of playing cards after the computer provides the final playing card dealt to said final dealer hand.

7. A method for conducting a wagering game in which at least one base wager is physically received on a physical gaming table using physical playing cards and a live dealer;
an initial player hand of playing cards is dealt by the dealer for each base wager, an initial dealer hand of physical playing cards and an initial dealer hand are dealt and displayed on the display by the live dealer, at least one final player hand is formed from the initial player hand by standing on said initial player hand or receiving from the dealer at least one additional physical playing card dealt to said initial player hand, wherein if a sum of the values of the physical playing cards in a final player hand exceeds a target value, said base wager is collected and play is terminated for said final player hand,
the dealer computer forming the final dealer hand from said initial dealer hand or standing on said initial dealer hand or receiving at least one additional playing card dealt to said initial dealer hand, and, when a sum of the values in the playing cards in said final dealer hand is less than or equal to said target value, any remaining base wagers are resolved by comparing each final player hand to said final dealer hand and said target value, wherein if an initial player hand contains playing cards with a sum equal to said target value, said base wager is rewarded at a predefined blackjack rate greater than even money, the method comprising:
the dealer defining a plurality of final dealer hands containing playing cards with a sum of the values of the playing cards that exceeds said target value is to be modified dealer bust hands;
the dealer providing a pay table correlating at least one of said modified dealer bust hands to an increased award greater than, or equal to, said predefined blackjack rate and at least one of said modified dealer bust hand value is correlated to a decreased award less than even money; and issuing said modified award on said base wager according to said pay table when said final dealer hand matches said modified dealer bust hand value and the sum of the playing cards in a final player hand does not exceed said target value.

* * * * *